United States Patent
Chen et al.

(10) Patent No.: US 10,750,314 B2
(45) Date of Patent: Aug. 18, 2020

(54) RECOMMENDATION METHOD IMPLEMENTED IN ELECTRONIC DEVICE

(71) Applicant: Chiun Mai Communication Systems, Inc., New Taipei (TW)

(72) Inventors: Yu-Chun Chen, New Taipei (TW); Cheng-Kuo Yang, New Taipei (TW); Mu-Ann Chen, New Taipei (TW); Ke-Chien Chou, New Taipei (TW)

(73) Assignee: Mobile Drive Technology Co., Ltd., New Taipei (TW)

( * ) Notice: Subject to any disclaimer, the term of this patent is extended or adjusted under 35 U.S.C. 154(b) by 0 days.

(21) Appl. No.: 16/405,327

(22) Filed: May 7, 2019

(65) Prior Publication Data

US 2019/0357004 A1  Nov. 21, 2019

(30) Foreign Application Priority Data

May 10, 2018 (CN) .......................... 2018 1 0442891

(51) Int. Cl.
*H04W 4/021* (2018.01)
*G06F 3/0481* (2013.01)
*G06F 3/0488* (2013.01)
*H04W 88/02* (2009.01)

(52) U.S. Cl.
CPC .......... *H04W 4/021* (2013.01); *G06F 3/0481* (2013.01); *G06F 3/04883* (2013.01); *H04W 88/02* (2013.01)

(58) Field of Classification Search
CPC ..... H04W 4/021; H04W 88/02; G06F 3/0481; G06F 3/04883
See application file for complete search history.

(56) References Cited

U.S. PATENT DOCUMENTS

| | | | | |
|---|---|---|---|---|
| 9,195,721 | B2 * | 11/2015 | Soto Matamala | H04W 4/21 |
| 2015/0169693 | A1 * | 6/2015 | Stekkelpak | G06F 16/2457 |
| | | | | 707/748 |
| 2018/0167766 | A1 * | 6/2018 | LaMarca | H04M 1/72522 |
| 2018/0314324 | A1 * | 11/2018 | Abed Aljawad | G06F 3/013 |

FOREIGN PATENT DOCUMENTS

| | | |
|---|---|---|
| CN | 103607698 A | 2/2014 |
| CN | 107273221 A | 10/2017 |
| CN | 107589885 A | 1/2018 |
| CN | 107807820 A | 3/2018 |
| TW | 200742833 | 11/2007 |
| TW | 201226956 | 7/2012 |

* cited by examiner

Primary Examiner — Marisol Figueroa
(74) Attorney, Agent, or Firm — ScienBiziP, P.C.

(57) ABSTRACT

An electronic device includes a display, a global positioning unit, a processor, and a memory. The global positioning unit establishes a location of the electronic device. The processor displays a user interface on the display, detects whether the user interface receives a predetermined gesture applied thereon, obtains a name of the location where the electronic device is located and a type of location corresponding to the name of the location when the predetermined gesture applied on the user interface is detected, and recommends relevant data on the user interface according to the type of location or the name of the location.

15 Claims, 8 Drawing Sheets

RECOMMENDATION METHOD IMPLEMENTED IN ELECTRONIC DEVICE

FIELD

The subject matter herein generally relates to electronic devices, and more particularly to an electronic device implementing a method for recommending relevant applications or settings according to a plugged in external device.

BACKGROUND

Generally, applications of an electronic device need to be manually selected by a user to be activated.

BRIEF DESCRIPTION OF THE DRAWINGS

Implementations of the present disclosure will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
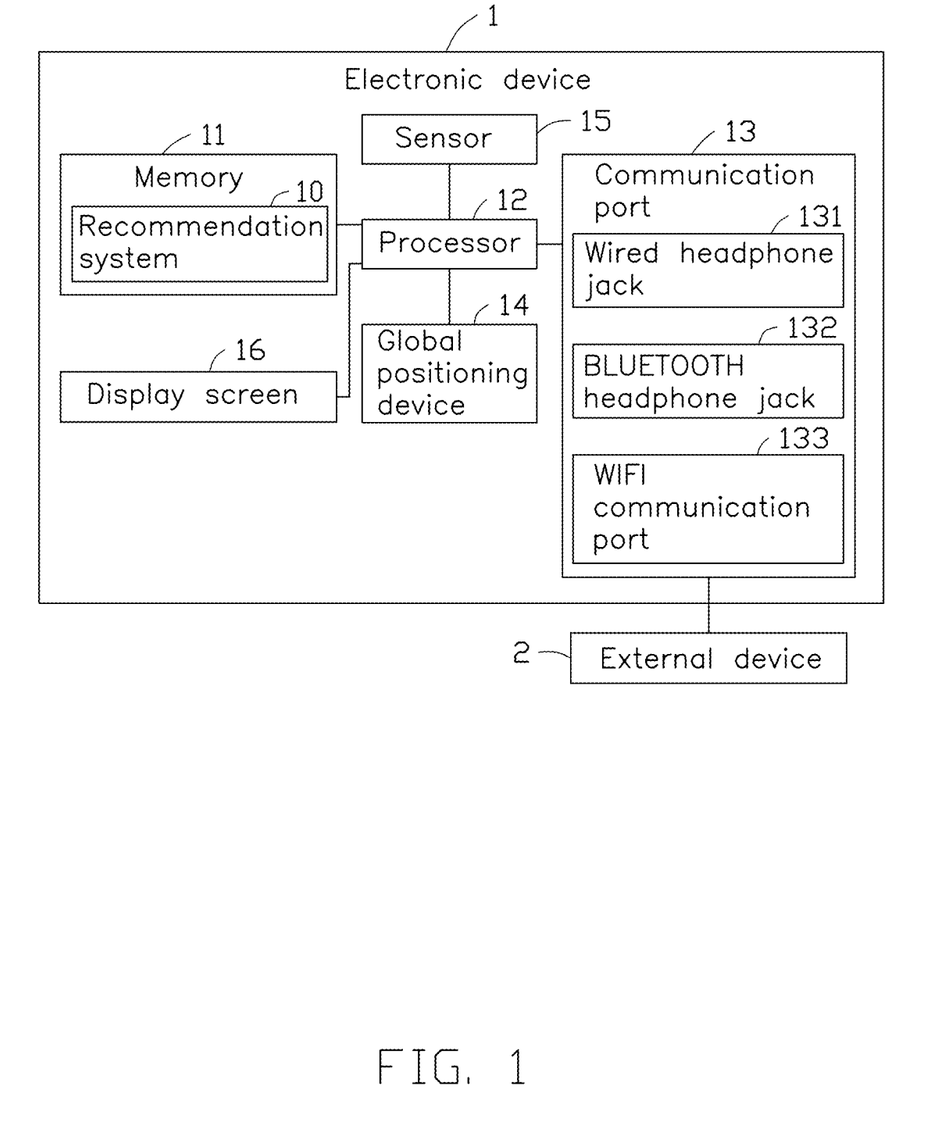
FIG. 1 is a block diagram of an embodiment of an electronic device implementing a recommendation system in accordance with an embodiment of the present disclosure.

FIG. 1 illustrates an embodiment of a recommendation system 10 implemented in an electronic device 1. The recommendation system 10 is capable of recommending relevant applications and relevant settings of the electronic device 1 according to an external device plugged into the electronic device 1, a location of the electronic device 1, and current movement parameters, such as a current speed, of the electronic device 1. Some details are discussed below.

In at least one embodiment, the electronic device 1 may include, but is not limited to, a memory 11, a processor 12, a communication port 13, a global positioning unit 14, a sensor 15, and a display 16. The memory 11, processor 12, communication port 13, global positioning unit 14, sensor 15, and display 16 are electrically coupled together.

In at least one embodiment, the electronic device 1 may be a tablet computer, a smart phone, a personal digital assistant, a gaming device, an Internet protocol television, a smart wearable device, or the like.

In at least one embodiment, the communication port 13 may include, but is not limited to, a wired headphone jack 131, a BLUETOOTH® headphone jack 132, and a WIFI communication port 133.

The external device 2 establishes communication with the electronic device 13 by being plugged into the electronic device 1.

For example, when the external device 2 is a wired headphone, the external device plugs into the wired headphone jack 131 to establish communication with the electronic device 1. When the external device 2 is a BLUETOOTH® headphone, the external device 2 plugs into the BLUETOOTH® headphone jack 132 to establish communication with the electronic device 1. When the external device 2 is a WIFI loudspeaker, the external device 2 plugs into the WIFI communication port 133 to establish communication with the electronic device 1.

The global positioning unit 14 establishes a location of the electronic device 1. In at least one embodiment, the global positioning unit 14 may be a global positioning system (GPS), an assisted global positioning system (AGPS), a BeiDou navigation satellite system (BDS), or a global navigation satellite system (GLONASS).

In at least one embodiment, the sensor 15 may be a gravity sensor for detecting a gravitational acceleration signal of the electronic device 1. The gravity sensor detects cyclical signals of gravitational acceleration so that the electronic device 1 is able to calculate a number of steps walked by a user carrying the electronic device 1. For example, for every cycle of gravitational acceleration, the electronic device 1 calculates two steps. Furthermore, according to a relationship between a quantity of steps taken within a length of time, the electronic device 1 is able to calculate whether a user is walking or running. For example, if less than three steps are taken within one second, the electronic device 1 determines that the user is walking. If more than three steps are taken within one second, the electronic device 1 determines that the user is speed-walking or running.

In another embodiment, the electronic device 1 is able to determine a speed of the electronic device 1 according to a length of time and a change in location detected by the global positioning unit 14. For example, when the global positioning unit 14 detects that the electronic device 1 is moved from a first location to a second location, the electronic device 1 calculates a speed of the electronic device 1 by dividing the distance travelled between the first location and the second location by a length of time between the first location and the second location.

In at least one embodiment, the display 16 displays information input by a user and provides a visual interface for a user. The visual interface may be made up of images, text, icons, videos, or other visual display medium. The display 16 may be a liquid crystal display, an organic light-emitting diode, or other display.

The display 16 may be a touch screen. When the display is a touch screen, the display 16 can display information input by a user. Because display technology is known in the art, it will not be described in detail here.

The memory 11 may include a read-only memory, a random access memory, a programmable read-only memory, an erasable programmable read-only memory, a one-time programmable read-only memory, an electrically-erasable programmable read-only memory, a compact disc read-only memory, or other disk storage device, magnetic disk storage device, magnetic tape storage device, or portable readable storage device.

In at least one embodiment, the processor 12 may be a central processing unit, a microprocessing unit, a data processing chip, an image processing chip or image processing device, or other processing device.

The processor 12 is a control unit of the electronic device 1 and executes a plurality of programs and instructions stored in the memory 11. Because functions of a processor are generally known in the art, they will not be described in detail here.

Figure 2:
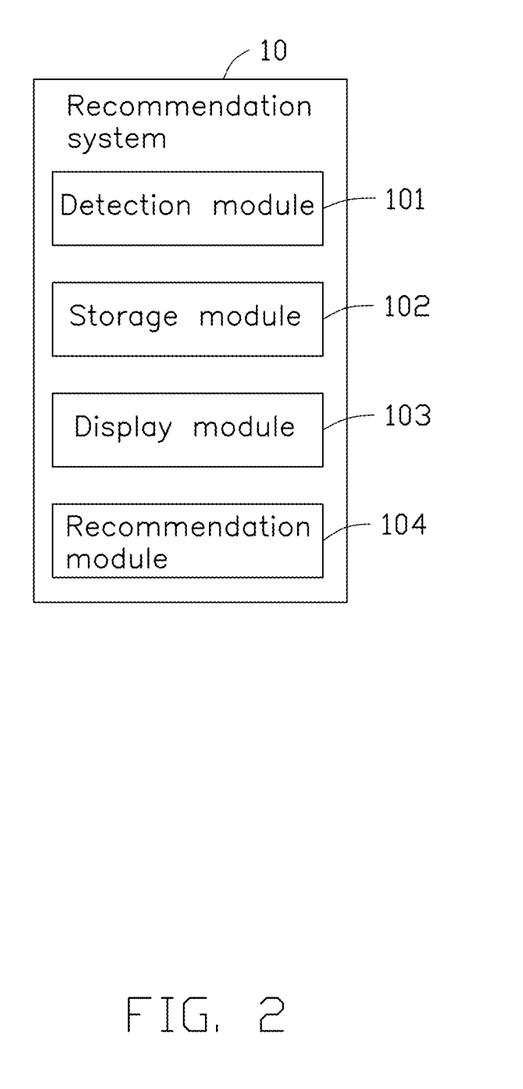
FIG. 2 is a block diagram of function modules of the recommendation system in FIG. 1.

In at least one embodiment, the recommendation system 10 is installed in and executed in the electronic device 1. The recommendation system 10 may be divided into a plurality of modules stored in the memory 11 and executed by the processor 12. For example, referring to FIG. 2, the plurality of modules of the recommendation system 10 may include a detection module 101, a storage module 102, a display module 103, and a recommendation module 104. The modules 101-104 can include one or more software programs in the form of computerized codes stored in the memory 11. The computerized codes can include instructions executed by the processor 12 to provide functions for the modules 101-104.

Figure 3:
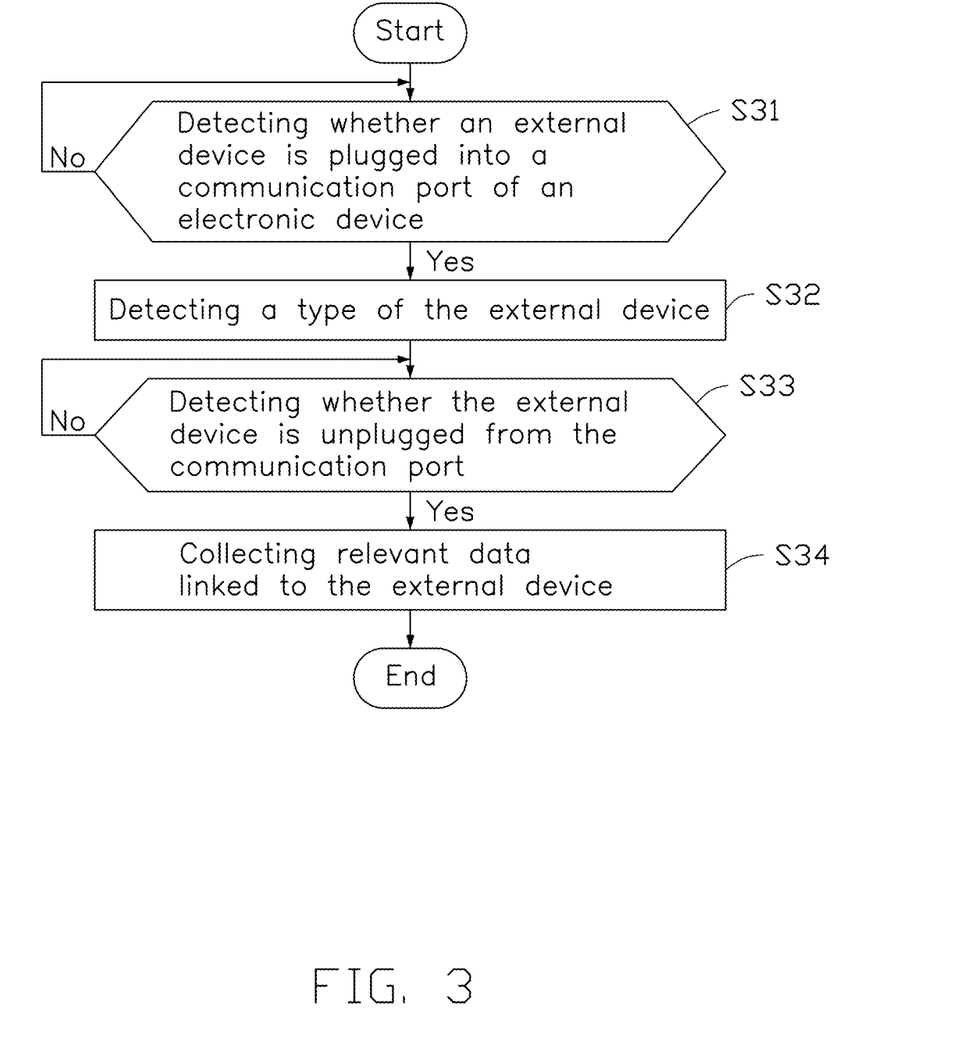
FIG. 3 is a flowchart of a method of the recommendation system collecting relevant data according to an external device plugged into the electronic device.

FIG. 3 illustrates a flowchart of a method of the recommendation system 10 collecting relevant data according to the external device 2 plugged into the electronic device 1. The example method is provided by way of example, as there are a variety of ways to carry out the method. The method described below can be carried out using the configurations illustrated in FIGS. 1-2, for example, and various elements of these figures are referenced in explaining the example method. Each block shown in FIG. 3 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block S31.

At block S31, the detection module 101 detects whether the external device 2 plugs into the communication port 13 of the electronic device 1. When the external device 2 plugs into the communication port 13, block S32 is implemented.

In detail, the external device 2 is detected to be plugged into the communication port 13 when an insertion signal generated by the communication port 13 is detected.

At block S32, the detection module 101 detects a type of the external device 2.

Different types of external devices 2 will cause the communication port 13 to generate different insertion signal numbers. Thus, the detection module 101 determines the type of the external device 2 according to the insertion signal number generated by the communication port 13.

For example, when the external device 2 is a wired headphone plugged into the wired headphone jack 131, the insertion signal number is "1". When the external device 2 is a BLUETOOTH® headphone plugged into the BLUETOOTH® headphone jack 132, the insertion signal number is "2". Thus, the insertion signal number is different for each kind of external device 2.

At block S33, the detection module 101 detects whether the external device 2 is unplugged from the communication port 13. When the external device 2 is unplugged form the communication port 13, block S34 is implemented.

At block S34, the storage module 102 collects relevant data linked to the external device 2. The relevant data linked to the external device 2 is an operation record within a predetermined time duration after the external device 2 plugs into the communication port 13. The storage module 102 stores the relevant data linked to the external device 2 in the memory 11.

In at least one embodiment, the predetermined time duration after the external device 2 plugs into the communication port 13 may be five minutes, ten minutes, fifteen minutes, or any other time duration, such as a time duration from the external device 2 being plugged into the communication port 13 to the external device 2 being plugged out of the communication port 13.

The operation record may include, but is not limited to, a record of which applications of the electronic device 1 were activated after the external device 2 was plugged into the communication port 2, a record of how many times each application was activated, a record of how long each application was executed, a record of which settings of the electronic device 1 were executed, and a record of how many times each setting was executed.

In at least one embodiment, the settings implemented of the electronic device 1 may include, but are not limited to, changing a volume setting, switching on or off a WIFI setting, switching on or off a camera, clearing storage of the electronic device 1, or the like.

In at least one embodiment, the storage module 102 obtains the operation record from a cache storage of the electronic device 1. The storage module 102 collects the relevant data of the electronic device 1 for the external device 2. The storage module 102 further stores the operation record of the electronic device 1. For example, the operation record may be stored in the memory 11.

In at least one embodiment, the storage module 102 creates the operation record of the electronic device 1 according to each kind of external device 2, so that each kind of external device 2 has a corresponding operation record.

For example, the storage module 102 may establish a first operation record as an EXCEL® table for a wired headphone to record the operation record of the electronic device 1 for each time the wired headphone plugs into the communication port 13. The storage module 102 may establish a second record as an EXCEL® table for a BLUETOOTH® headphone to record the operation record of the electronic device 1 for each time the BLUETOOTH® headphone plugs into the communication port 13. The storage module 102 may store the first operation record and the second operation record in the memory 11.

For ease of explanation, recording of the operation record of a wired headphone plugged into the communication port 13 within a predetermined time duration of ten minutes is described. For example, within ten minutes after the wired headphone plugs in, the electronic device 1 implements a music application for five minutes, and implements a video application for two minutes. The storage module 102 adds one instance of using the music application and one instance of using the video application to the first operation record, and adds five minutes to the total time of using the music application and two minutes to the total time of using the video application to the first operation record.

Figure 4:
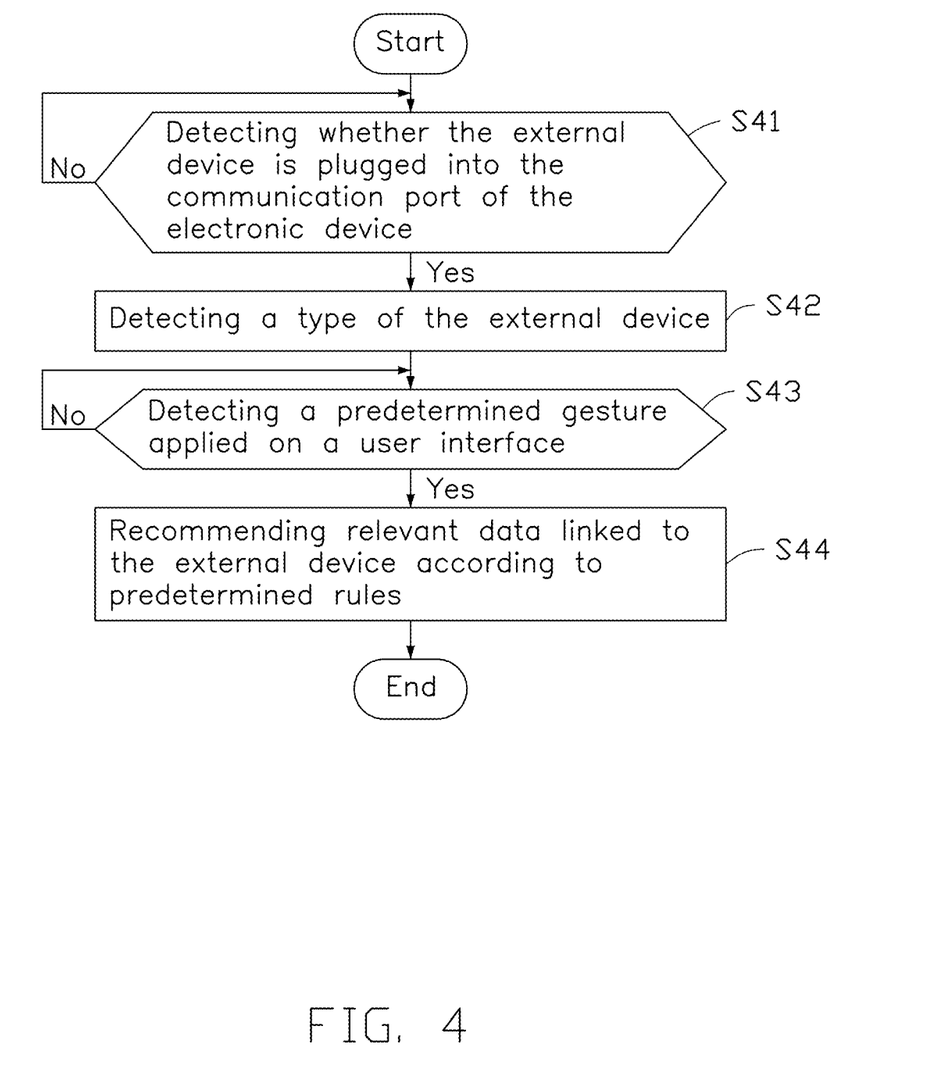
FIG. 4 is flowchart of a recommendation method.

FIG. 4 illustrates a flowchart of a recommendation method. The method is provided by way of example, as there are a variety of ways to carry out the method. The method described below can be carried out using the configurations illustrated in FIGS. 1-3, for example, and various elements of these figures are referenced in explaining the example method. Each block shown in FIG. 4 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block S41.

At block S41, the detection module 101 detects whether the external device 2 plugs into the communication port 13 of the electronic device 1. When the external device 2 plugs into the communication port 13, block S42 is implemented.

In detail, the external device 2 is detected to be plugged into the communication port 13 when an insertion signal generated by the communication port 13 is detected.

At block S42, the detection module 101 detects a type of the external device 2.

Different types of external devices 2 will cause the communication port 13 to generate different insertion signal numbers. Thus, the detection module 101 determines the type of the external device 2 according to the insertion signal number generated by the communication port 13.

For example, when the external device 2 is a wired headphone plugged into the wired headphone jack 131, the insertion signal number is "1". When the external device 2 is a BLUETOOTH® headphone plugged into the BLUETOOTH® headphone jack 132, the insertion signal number is "2". Thus, the insertion signal number is different for each kind of external device 2.

In at least one embodiment, the display module 103 displays the user interface as a widget on a main page of the display 16, or displays the user interface on an interface of the display 16 different from the main page. For example, the user interface may be displayed on a sub-interface on the display 16. The sub-interface may be positioned on a left side of the main page. For example, the sub-interface may be displayed when a right-swipe gesture is applied on the display 16 to switch the interface displayed on the display 16 to the sub-interface.

Figure 7:
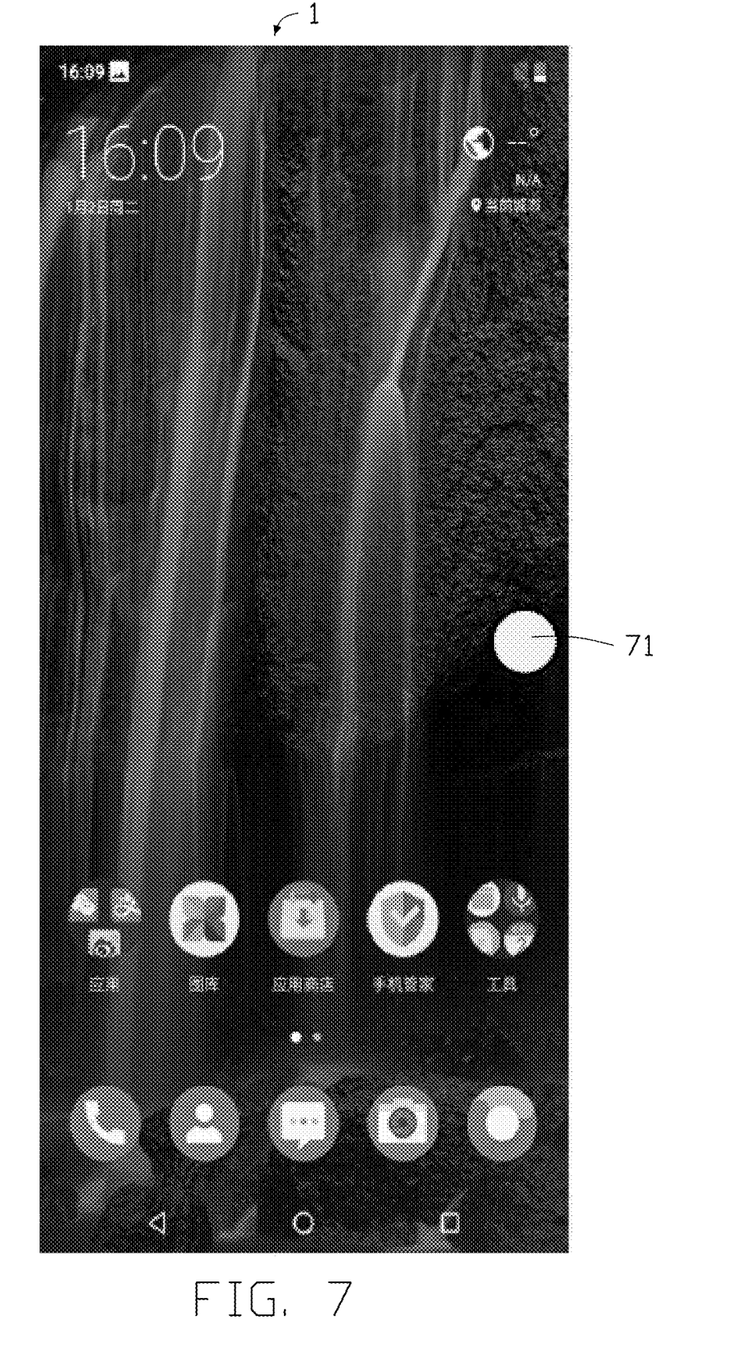
FIG. 7 is a diagram of a user interface displayed on a main page of a display of the electronic device.

For example, as illustrated in FIG. 7, the display module 103 displays the user interface as a widget 71 on the main page on the display 16. The main page on the display 16 further displays icons of the plurality of applications of the electronic device 1, a local time, and the like.

In at least one embodiment, the display module 103 displays the user interface, such as the widget 71, in a default position, such as on a right side of the display 16 in a central position. The display module 103 can further respond to a dragging gesture applied on the widget 71 to adjust a position of the widget 71 on the display 16.

At block S43, the detection module 101 detects a predetermined gesture applied on the user interface. When the predetermined gesture is detected, block S44 is implemented.

In at least one embodiment, the predetermined gesture may be a single touch gesture or a long press gesture. For example, the long press gesture may be determined by pressing on the user interface for a predetermined time duration, such as two seconds.

At block S44, the recommendation module 104 recommends relevant data linked to the external device 2 according to predetermined rules. The display module 103 displays the recommended relevant data linked to the external device 2 in the user interface.

In at least one embodiment, the display module 103 displays the relevant data linked to the external device 2 around a periphery of the user interface. For example, the relevant data linked to the external device 2 may be displayed in sequence as an arc around the user interface.

For ease of explanation of one embodiment, the relevant data includes the applications implemented by the electronic device 1 and a frequency of each application executed.

In at least one embodiment, the recommendation module 104 orders the applications recorded of the relevant data according to a frequency of the applications executed. The recommendation module 104 recommends an M number of applications having a highest frequency of execution. M is a positive integer greater than 1. The display module 103 displays the icons of the M number of applications having the highest frequency of execution in the user interface or around the periphery of the user interface. The recommendation module 104 implements a corresponding one of the applications when the recommendation module 104 receives an activation signal of the application. The activation signal may be generated by a user applying a touch operation on the icon of the application displayed in the user interface or displayed around the periphery of the user interface.

In another embodiment, the recommendation module 104 recommends the application having the highest frequency of execution. The display module 103 displays the icon of the application having the highest frequency of execution in the user interface. The recommendation module 104 implements the application having the highest frequency of execution when the recommendation module 104 receives an activation signal of the application. The activation signal may be generated by a user applying a touch operation on the icon of the application having the highest frequency of execution displayed in the user interface.

For ease of explanation of another embodiment, the relevant data includes the applications implemented by the electronic device 1 and a total length of time of each application executed.

In at least one embodiment, the recommendation module 104 orders the applications recorded of the relevant data according to the total length of time of the applications executed. The recommendation module 104 recommends an M number of applications having a longest total length of time of execution. M is a positive integer greater than 1. The display module 103 displays the icons of the M number of applications having the longest total length of time of execution in the user interface or around the periphery of the user interface. The recommendation module 104 implements a corresponding one of the applications when the recommendation module 104 receives an activation signal of the application. The activation signal may be generated by a user applying a touch operation on the icon of the application displayed in the user interface or displayed around the periphery of the user interface.

For ease of explanation of another embodiment, the relevant data includes the settings of the electronic device 1 implemented and a frequency of each setting of the electronic device 1 executed.

In at least one embodiment, the recommendation module 104 orders the settings of the electronic device 1 according to the frequency of the settings executed. The recommendation module 104 recommends an M number of settings having a highest frequency of execution. The display module 103 may display the M number of settings having the highest frequency of execution as a list in the user interface. The recommendation module 104 implements a corresponding one of the settings when the recommendation module 104 receives an activation signal of the setting.

In at least one embodiment, the recommendation module 104 recommends the setting having the highest frequency of execution. The display module 103 may display the setting having the highest frequency of execution in the user interface. The recommendation module 104 implements the setting having the highest frequency of execution when the recommendation module 104 receives an activation signal of the setting.

Figure 8:
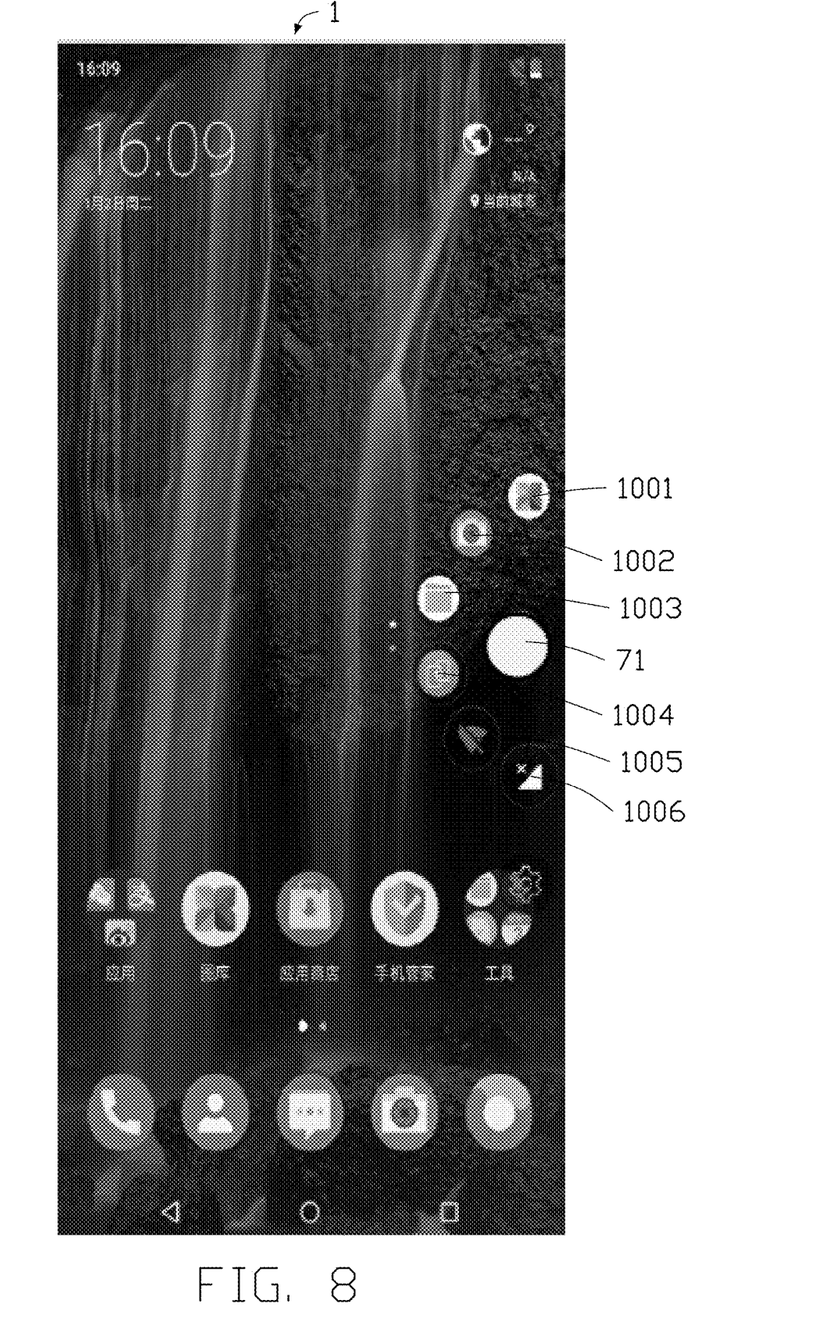
FIG. 8 is a diagram of icons of a plurality of applications and settings recommended by the recommendation system displayed around an outer periphery of the user interface in FIG. 7.

For example, referring to FIG. 8, the display module 103 displays in sequence as an arc around the widget 71 the icons of four applications 1001, 1002, 1003, 1004 having the highest frequency of execution and the icons of two settings 1006, 1006 having the highest frequency of execution. The icons are not limited to be displayed as an arc, but can also be displayed in other shapes, such as in a vertical list.

Figure 5:
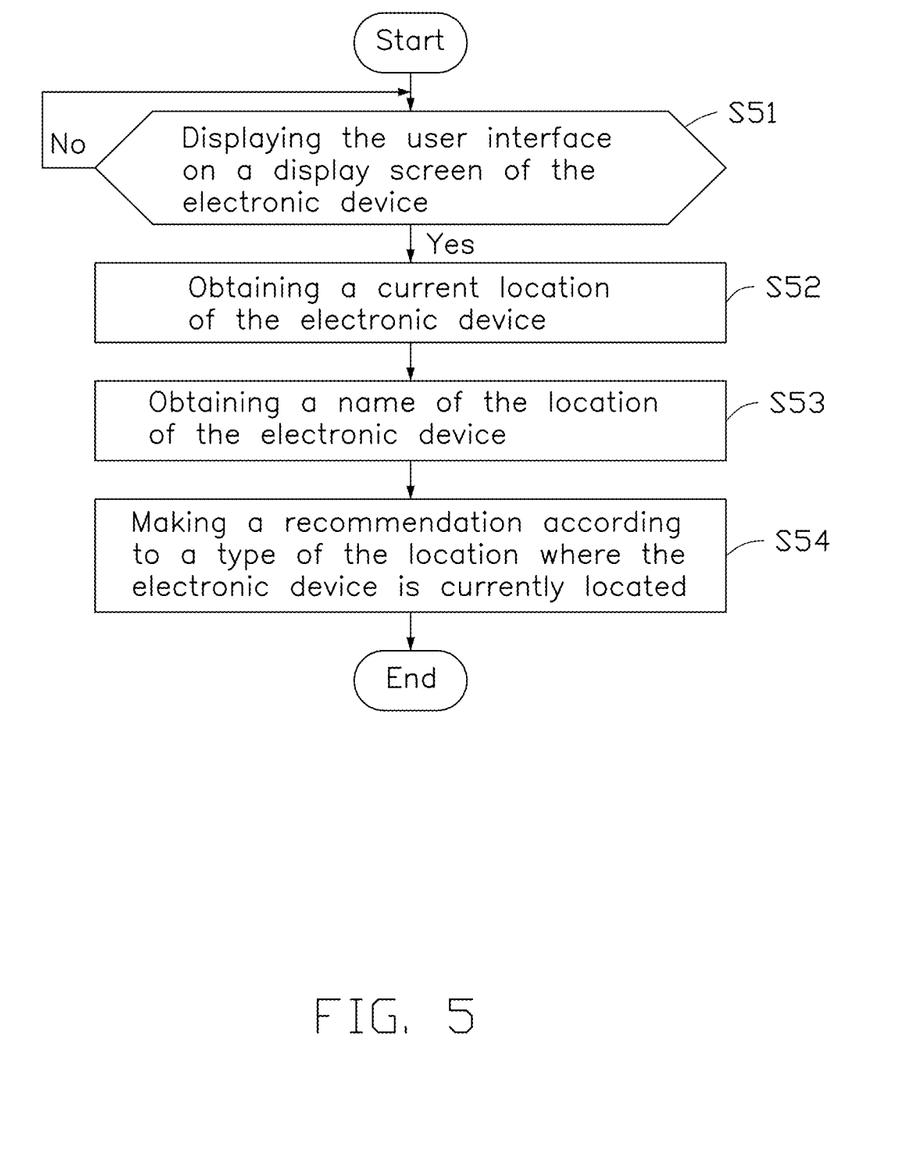
FIG. 5 is a flowchart of a second recommendation method.

FIG. 5 illustrates a flowchart of a second recommendation method. The example method is provided by way of example, as there are a variety of ways to carry out the method. The method described below can be carried out using the configurations illustrated in FIGS. 1-3, for example, and various elements of these figures are referenced in explaining the example method. Each block shown in FIG. 5 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block S51.

At block S51, the display module 103 displays the user interface on the display 16 of the electronic device 1. The detection module 101 detects a predetermined gesture on the user interface. When the predetermined gesture is detected, block S52 is implemented.

In at least one embodiment, the predetermined gesture may be a single touch gesture or a long press gesture. For example, the long press gesture may be determined by pressing on the user interface for a predetermined time duration, such as two seconds.

In at least one embodiment, the display module 103 displays the user interface as a widget on a main page of the display 16, or displays the user interface on an interface of the display 16 different from the main page.

At block S52, the detection module 101 obtains a current location of the electronic device 1.

In at least one embodiment, the detection module 101 obtains the current location of the electronic device 1 from the global positioning unit 14 of the electronic device 1.

In another embodiment, the detection module 101 obtains the current location of the electronic device 1 according to a wireless signal received by a wireless communication unit of the electronic device 1. For example, when the electronic device 1 logs onto a free WIFI service of a particular fast food store, the location of the electronic device 1 is determined according to basic information of a WIFI base station of the Fast food store.

At block S53, the detection module 101 obtains a name of the location of the electronic device 1. The detection module 101 further determines a type of the location according to the name of the location.

In at least one embodiment, the detection module 101 obtains the name of the location and the type of the location according to the location of the electronic device 1 obtained from a map, such as a map application. For example, the type of the location includes "restaurant", "office building", "scenic spot", or the like.

For example, the detection module 101 may obtain from the map that the name of the location of the electronic device 1 is "RESTAURANT" and the type of the location is "restaurant".

At block S54, the recommendation module 104 makes a recommendation according to the type of the location where the electronic device 1 is currently located. The recommendation includes, but is not limited to, an application of the type of location, a setting of the electronic device 1, or the like.

In at least one embodiment, the recommendation module 104 may pre-establish a relationship between the type of location and a corresponding application and/or corresponding settings implemented of the electronic device 1. In at least one embodiment, the settings implemented of the electronic device 1 may include, but are not limited to, changing a volume setting, switching on or off a WIFI setting, switching on or off a camera, clearing storage of the electronic device 1, or the like. When the detection module 101 obtains the type of location according to the name of the location where the electronic device 1 is located, the recommendation module 104 is able to recommend corresponding applications and/or corresponding settings of the electronic device 1.

For example, the recommendation module 104 pre-establishes a relationship between the type of location "restaurant" with an electronic payment application. The type of location "office building" may have a relationship with a setting for volume control. The type of location "scenic spot" may have a relationship with a camera application of the electronic device 1. If the detection module 101 obtains the name of the location where the electronic device 1 is located to be "RESTAURANT", the corresponding type of location is "restaurant". In at least one embodiment, the recommendation module 104 recommends the payment application in the user interface. In another embodiment, the recommendation module 104 recommends the payment application in the outer periphery of the user interface.

In at least one embodiment, when the name of the location is one of a predetermined one or more name of location, such as "RESTAURANT" or "FAST FOOD STORE", the recommendation module 104 searches the electronic device 1 for a corresponding application of the location. In at least one embodiment, the application is installed in the electronic device 1 and has the same name as the name of the location. If the electronic device 1 already has the corresponding application installed, the recommendation module 104 recommends the application by displaying the icon of the application in the user interface or in the outer periphery of the user interface.

For example, when the detection module 101 obtains the name of the location of the electronic device 1 to be "Restaurant", the recommendation module 104 searches the electronic device 1 whether the corresponding application named "RESTAURANT" is installed in the electronic device 1. When the recommendation module finds the corresponding application named "RESTAURANT" in the electronic device 1, the icon of the application "RESTAURANT" is displayed in the user interface.

The recommendation module 104 further is able to receive an activation signal of the application "RESTAURANT" and activate the application "RESTAURANT" in response to the activation signal. The activation signal may be generated by a user applying a touch operation on the icon of the application "RESTAURANT" displayed in the user interface. In another embodiment, the recommendation module 104 further pre-establishes a relationship among the name of the location "RESTAURANT", the type of location "restaurant", and an application for electronic payment, such as a payment application. The recommendation module 104 further displays the icon of the payment application near the icon of the application "RESTAURANT".

Figure 6:
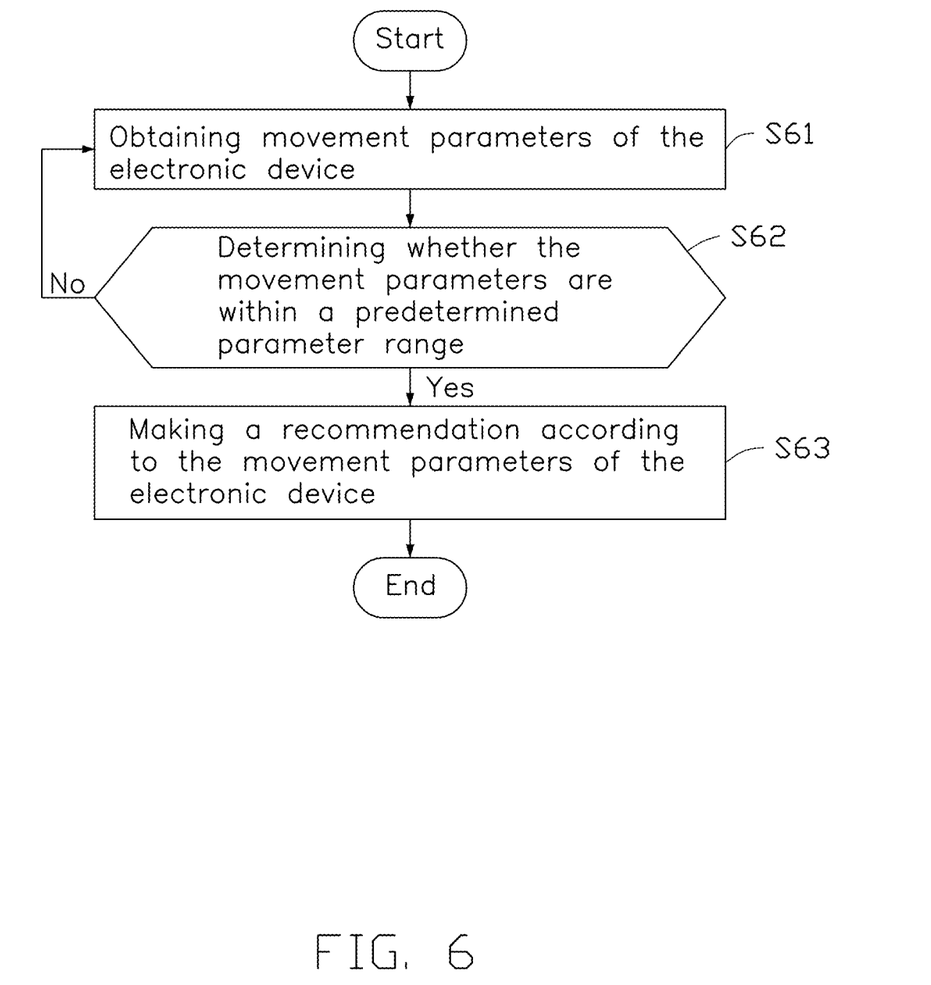
FIG. 6 is a flowchart of a third recommendation method.

FIG. 6 illustrates a flowchart of a third recommendation method. The example method is provided by way of example, as there are a variety of ways to carry out the method. The method described below can be carried out using the configurations illustrated in FIGS. 1-3, for example, and various elements of these figures are referenced in explaining the example method. Each block shown in FIG. 6 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block S61.

At block S61, the detection module 101 obtains movement parameters of the electronic device 1.

In at least one embodiment, the detection module 101 obtains the movement parameters according to the sensor 15 of the electronic device 1. In at least one embodiment, the movement parameters may be step information of the electronic device 1.

In at least one embodiment, the sensor 15 may be a gravity sensor for detecting a gravitational acceleration signal of the electronic device 1. The gravity sensor detects cyclical signals of gravitational acceleration so that the electronic device 1 is able to calculate a number of steps walked by a user carrying the electronic device 1. For example, for every cycle of gravitational acceleration, the electronic device 1 calculates two steps. Furthermore, according to a relationship between a quantity of steps taken within a length of time, the electronic device 1 is able to calculate whether a user is walking or running. For example, if less than three steps are taken within one second, the electronic device 1 determines that the user is walking. If more than three steps are taken within one second, the electronic device 1 determines that the user is running.

In another embodiment, the movement parameters may be a speed of the electronic device 1. The detection module 101 calculates a speed of the electronic device 1 according to a length of time and a change in location detected by the global positioning unit 14. For example, when the global positioning unit 14 detects that the electronic device 1 is moved from a first location to a second location, the electronic device 1 calculates a speed of the electronic device 1 by dividing the distance travelled between the first location and the second location by a length of time between the first location and the second location.

At block S62, the detection module 101 determines whether the movement parameters are within a predetermined parameter range. When the movement parameters are within the predetermined parameter range, block S63 is implemented. When the movement parameters are not within the predetermined parameter range, block S61 is repeated.

Using the speed as an example, the predetermined parameter range is a speed greater than 20 kilometers per hour. If the speed of the electronic device 1 is 40 kilometers per hour, then the detection module 101 determines that the movement parameters are within the predetermined parameter range, and block S63 is implemented.

Using the steps as another example, the predetermined parameter range is a speed-walking or running pace of the electronic device 1. When the detection module 101 determines that the electronic device 1 is in a speed-walking or running pace according to a step count of the electronic device 1, the detection module 101 determines that the parameters are within the predefined parameter range, and block S63 is implemented.

At block S63, the recommendation module 104 makes a recommendation according to the movement parameters of the electronic device 1.

In at least one embodiment, the recommendation module 104 recommends an application for navigation. The display module 103 displays the user interface and displays the icon of the application for navigation in the user interface.

In another embodiment, the recommendation module 104 automatically activates a designated application of the electronic device 1, such as a music application for broadcasting music.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An electronic device comprising:
a display;
a global positioning unit for establishing a location of the electronic device;
a processor; and
a memory configured to store a plurality of instructions, which when executed by the processor, cause the processor to:
    display a user interface on the display, wherein the user interface is a widget;
    detect whether the user interface receives a predetermined gesture applied thereon, wherein the predetermined gesture is a single touch gesture or a long press gesture;
    obtain, when the predetermined gesture applied on the user interface is detected, a name of the location where the electronic device is located and a type of location corresponding to the name of the location; and recommend, according to the type of location or the name of the location, one or more applications by displaying icons of the one or more applications in an outer periphery of the user interface.

2. The electronic device of claim 1, wherein the icons of the one or more applications are displayed in sequence as an arc around the outer periphery of the user interface.

3. The electronic device of claim 1, wherein the user interface is displayed on a main page of the display, or the user interface is displayed on an interface of the display different from the main page.

4. The electronic device of claim 1, wherein the processor obtains the name of the location and the type of location where the electronic device is located from a designated map according to the location of the electronic device.

5. The electronic device of claim 1, wherein the widget is displayed in a default position of the display, and the processor is further caused to:

adjust the default position of the widget in response to a dragging gesture applied on the widget.

6. A recommendation method implemented in an electronic device comprising a display and a global positioning unit, the method comprising:

establishing a location of the electronic device;

displaying a user interface on the display, wherein the user interface is a widget;

detecting whether the user interface receives a predetermined gesture applied thereon, wherein the predetermined gesture is a single touch gesture or a long press gesture;

obtaining, when the predetermined gesture applied on the user interface is detected, a name of the location where the electronic device is located and a type of location corresponding to the name of the location; and recommending, according to the type of location or the name of the location, one or more applications by displaying icons of the one or more applications in an outer periphery of the user interface.

7. The method of claim 6, wherein the icons of the one or more applications are displayed in sequence as an arc around the outer periphery of the user interface.

8. The method of claim 6, wherein the user interface is displayed on a main page of the display, or the user interface is displayed on an interface of the display different from the main page.

9. The method of claim 6, further comprising obtaining the name of the location and the type of location where the electronic device is located from a designated map according to the location of the electronic device.

10. The method of claim 6, wherein the widget is displayed in a default position of the display, and the method further comprises:

adjusting the default position of the widget in response to a dragging gesture applied on the widget.

11. A non-transitory storage medium having stored thereon instructions that, when executed by at least one processor of an electronic device comprising a display and a global positioning unit, causes the least one processor to execute instructions of a recommendation method, the method comprising:

establishing a location of the electronic device;

displaying a user interface on the display, wherein the user interface is a widget;

detecting whether the user interface receives a predetermined gesture applied thereon, wherein the predetermined gesture is a single touch gesture or a long press gesture;

obtaining, when the predetermined gesture applied on the user interface is detected, a name of the location where the electronic device is located and a type of location corresponding to the name of the location; and recommending, according to the type of location or the name of the location, one or more applications by displaying icons of the one or more applications in an outer periphery of the user interface.

12. The non-transitory storage medium of claim 11, wherein the icons of the one or more applications are displayed in sequence as an arc around the outer periphery of the user interface.

13. The non-transitory storage medium of claim 11, wherein the user interface is displayed on a main page of the display, or the user interface is displayed on an interface of the display different from the main page.

14. The non-transitory storage medium of claim 11, wherein the method further comprises obtaining the name of the location and the type of location where the electronic device is located from a designated map according to the location of the electronic device.

15. The non-transitory storage medium of claim 11, wherein the widget is displayed in a default position of the display, and the method further comprises:

adjusting the default position of the widget in response to a dragging gesture applied on the widget.

\* \* \* \* \*